(12) United States Patent
Kim et al.

(10) Patent No.: US 7,626,961 B2
(45) Date of Patent: *Dec. 1, 2009

(54) METHOD OF MANAGING MOBILE STATION IN BROADBAND WIRELESS ACCESS SYSTEM

(75) Inventors: Yong-Ho Kim, Bucheon (KR); Jin Lee, Seoul (KR); Yong-Won Kwak, Anyang (KR)

(73) Assignee: LG Electronics Inc., Seoul (KR)

( * ) Notice: Subject to any disclaimer, the term of this patent is extended or adjusted under 35 U.S.C. 154(b) by 661 days.

This patent is subject to a terminal disclaimer.

(21) Appl. No.: 11/388,346

(22) Filed: Mar. 24, 2006

(65) Prior Publication Data
US 2006/0233198 A1   Oct. 19, 2006

(30) Foreign Application Priority Data
Mar. 24, 2005   (KR) .......................... 10-2005-24703

(51) Int. Cl.
*H04W 4/00* (2009.01)
(52) U.S. Cl. ........................................ 370/328; 703/13
(58) Field of Classification Search ................. 370/328; 703/13
See application file for complete search history.

(56) References Cited

U.S. PATENT DOCUMENTS

| 5,870,588 | A | * | 2/1999 | Rompaey et al. .............. 703/13 |
| 6,542,490 | B1 | | 4/2003 | Ahmadvand et al. |
| 6,611,521 | B1 | | 8/2003 | McKay et al. |
| 2005/0043050 | A1 | | 2/2005 | Lee et al. |

FOREIGN PATENT DOCUMENTS

| KR | 2004-0040224 | 5/2004 |
| TW | 592418 | 6/2004 |
| WO | WO 2004-043009 A1 | 5/2004 |
| WO | WO 2004043009 A1 | 5/2004 |

* cited by examiner

*Primary Examiner*—William D Cumming
(74) *Attorney, Agent, or Firm*—Lee, Hong, Degerman, Kang & Waimey

(57) ABSTRACT

The primitives between an upper management layer and the MAC layer within a mobile station and a base station are defined in order to specify and clarify the operations within the protocol stack layers in a broadband wireless access system to allow management of a mobile station. Media Independent Handover (MIH) procedures can be achieved because the NCMS and MIH layer can communicate through use of these primitives.

13 Claims, 15 Drawing Sheets

METHOD OF MANAGING MOBILE STATION IN BROADBAND WIRELESS ACCESS SYSTEM

CROSS REFERENCE TO RELATED APPLICATION

Pursuant to 35 U.S.C. § 119, this application claims the benefit of earlier filing date and right of priority to Korea Application No. 10-2005-24703, filed Mar. 24, 2005, the contents of which are hereby incorporated by reference herein in its entirety.

FIELD OF THE INVENTION

The present invention relates to a broadband wireless access system, and more particularly, to a method of clearly defining the primitives used for the protocol stack within the mobile station and the protocol stack within the base station, in order to manage a mobile station.

BACKGROUND ART

The present invention relates to protocol signaling in a broadband wireless access network, and more particularly, to a method of managing mobile stations using primitives.

FIG. 1 depicts an exemplary protocol stack architecture for a broadband wireless access system.

Table 1 shows an example of a RES-CMD message.

TABLE 1

| Syntax | Size | Notes |
|---|---|---|
| RES-CMD Message Format ( ) { | | |
| Management Message Type = 25 | 8 bits | |
| TLV Encoded Information { | variable | TLV specific |
| HMAC Tuple | | See 11.4.10 |
| } | | |
| } | | |

The RES-CMD message should be sent as part of the basic CID of the mobile station such that the base station makes to mobile station perform a reset procedure, re-initialize the mobile station MAC layer, and repeat the initial system access procedures.

If the mobile station is unresponsive to the base station or when continuous abnormalities are detected from the mobile station on the uplink, the RES-CMD message may be used. The RES-CMD is comprised of TLV tuples that should have the parameters included therein after being encoded. The HMAC tuple should be the last attribute within the message.

Table 2 shows an example of a REG-RQ message.

TABLE 2

| Syntax | Size | Notes |
|---|---|---|
| DREG-REQ_message Format( ) | | |
| { | | |
| Management Message type = 49 | 8 bits | |
| De-registration Request Code | 8 bits | 0x00 = MS de-registration request from BS and network 0x01-0xFF = reserved |
| TLV encoded parameters | variable | |
| { | | |
| HMAC Tuple | | |
| } | | |
| } | | |

The mobile station sends the DREG-REQ (De-registration request) message to the base station, and may request de-registration of a normal operation service with respect to a corresponding mobile station. The De-registration Request Code informs the de-registration request type. For example, 0x00 refers to a mobile station de-registration request from the base station.

Table 3 shows an example of a DREG-CMD message.

TABLE 3

| Syntax | Size | Notes |
|---|---|---|
| DREG-CMD Message Format ( ) { | | |
| Management Message Type = 29 | 8 bits | |
| Action Code | 8 bits | |
| TLV Encoded parameters { | variable | TLV specific |
| REQ-duration | 8 bits | Waiting value for the DREG-REQ message retransmission (measured in frames) |
| HMAC Tuple | | See 11.4.10 |
| } | | |
| } | | |

The DREG-CMD message should be send from the base station in order to force the mobile station to change its connectivity state. The DREG-CMD message is transmitted as part of the basic CID of the mobile station. Upon receiving the DREG-CMD, the mobile station performs the operation indicated by the action (operation) code.

Table 4 shows examples of action codes and their corresponding actions.

TABLE 4

| Action Code | Actions |
|---|---|
| 0x00 | MS shall immediately terminate service with the BS and attempt network entry at another BS. |
| 0x01 | MS shall listen to the current BS but shall not transmit until an RES-CMD message or DREG-CMD with Action Code 0x003 is received. |
| 0x02 | MS shall listen to the current BS but only transmit on the Basic, Preliminary management, and Secondary management connections. |
| 0x03 | MS shall return to normal operation and may transmit on any of its active connections. |
| 0x04 | MS shall terminate current normal operations with the BS, the BS shall transmit this action code only in response to any MS DREG-REQ. |
| 0x05 | Reserved |
| 0x06 | MA may retransmit the DREG-REQ after the time duration (REG-duration) provided in the message. |
| 0x07 | MS shall not retransmit the DREG-REQ and shall await DREG-CMD. |
| 0x08-0xFF | Reserved |

The DREG-CMD is comprised of TLV tuples that should have the parameters included therein after being encoded. The HMAC tuple should be the last attribute within the message.

FIG. 2 depicts an exemplary signal flow for procedures of de-registration for power down. As shown in FIG. 2, the mobile station transmits a DREG-CMD to the base station to terminate its power (S21). Here, 0x00 that refers to a request for de-registration of the mobile station from the base station is transmitted. The base station authorizes this by transmitting the DREG-CMD action code 0x04 (S22).

FIG. 3 depicts an exemplary signal flow for procedures of resetting the mobile station. As shown in FIG. 3, upon detecting an abnormal operation of the mobile station, the base station sends a RES-CMD to the mobile station to perform reset thereof (S31). The mobile station rests itself and initializes its MAC layer.

FIG. 4 depicts an exemplary signal flow for procedures of holding a normal operation of the mobile station. As shown in FIG. 4, whether due to abnormal operations of the mobile station or due to other network conditions, the base station hold the normal operation of the mobile station by using the DREG-CMD (0x01) (S41). Upon receiving this, the mobile station holds its normal operation until a RES-CMD or a DREG-CMD (0x03) message is received.

The base station determines whether the mobile station may return to its normal operation, and instructs the mobile station to do so through a DREG-CMD (0x03) message (S42). Upon receiving this message, the mobile station performs its normal operation.

FIG. 5 depicts an exemplary signal flow for procedures of resetting after holding a normal operation of the mobile station. As shown in FIG. 5, whether due to abnormal operations of the mobile station or due to other network conditions, the base station hold the normal operation of the mobile station by using the DREG-CMD (0x01) (S51). Upon receiving this, the mobile station holds its normal operation until a RES-CMD or a DREG-CMD (0x03) message is received (S52).

The base station determines that the mobile station should perform reset, and transmits a RES-CMD for resetting the mobile station. Upon receiving this, the mobile station resets itself and initializes its MAC layer.

As explained above, in the related art, the messages used by the mobile station to perform scanning that are transmitted and received with the base station are defined, but the operations actually related to scanning are not defined for the protocol stack (layers) within the mobile station and the protocol stack (layers) within the base station. Thus, even when there is a need to manage the mobile station or base station by providing a separate management system, such cannot be achieved.

SUMMARY

One aspect of the present invention involves the recognition by the present inventors of the drawbacks in the related art as explained above. In order to address such problems, the present invention provides a method of defining the primitives between an upper management layer and the MAC layer in order to specify and clarify the operations within the protocol stack layers in a broadband wireless access system to allow managing of a mobile station.

BRIEF DESCRIPTION OF THE DRAWINGS

The accompanying drawings, which are included to provide a further understanding of the invention, are incorporated in and constitute a part of this application, illustrate embodiment(s) of the invention and together with the description serve to explain the principle of the invention. In the drawings.

DETAILED DESCRIPTION

The present invention is described as being implemented in a broadband wireless access system, such as a 802.16e network. However, the present invention may also be adapted and implemented in communication systems operating under other types of communication specifications (e.g., 802.16g, 802.21, 802.11u, etc.), because the concepts and teachings of the present invention could be applied to various communication schemes that operate in a similar manner based upon common techniques. Non-limiting exemplary embodiments of the present invention are explained below with reference to the attached Figures.

Also, certain aspects of the present invention will be described with respect to particular names for the entities, interfaces, primitives, messages, etc., but those skilled in the art will clearly understand that such names are non-limiting, as other names (label, terms, etc.) may also be used as long as their functions correspond with those taught by the present invention.

A feature of the present invention is to provide a method of managing a mobile station, comprising: receiving, by a mobile station MAC layer, a de-registration request from an upper management entity; transmitting, by the mobile station to a base station, a de-registration request message (DREG_REQ); receiving a de-registration command message (DREG-CMD) from the base station; transmitting, by the mobile station MAC layer to the upper management entity, the information included in the de-registration command message; receiving, from the upper management entity, a power down request; and reducing the power of the mobile station.

The above and additional features and advantages of the present invention will become more apparent with reference to the attached Figures and detailed description. Some embodiments of the present invention will be explained in more detail in view of the attached Figures.

Figure 6:
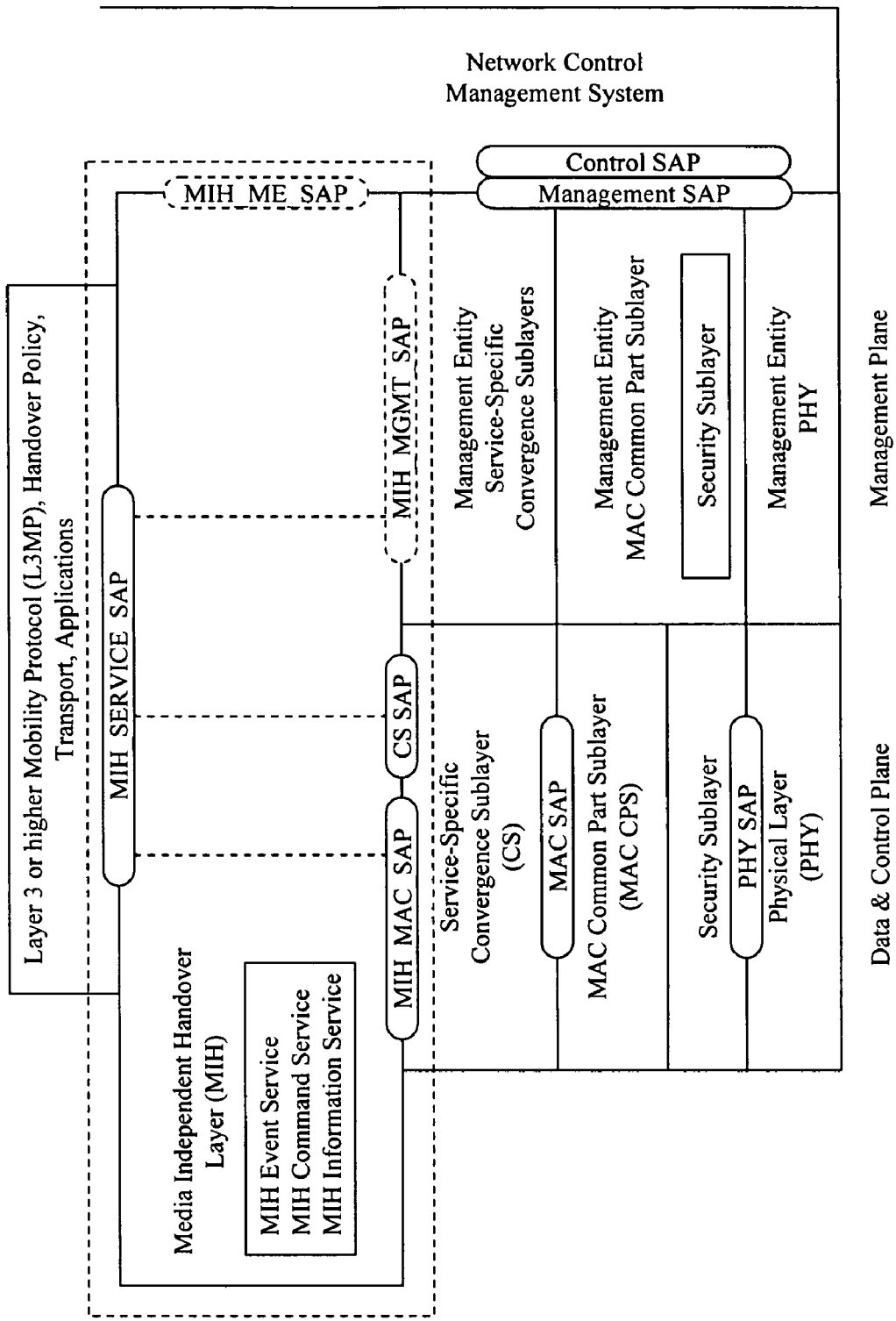
FIG. 6 depicts an exemplary protocol architecture model that considers Media Independent Handover (MIH).

FIG. 6 depicts an exemplary protocol architecture model that considers Media Independent Handover (MIH).

The primitives provided by the present invention are delivered (transferred) to the NCMS (Network Control & Management System) via a Management SAP (M-SAP) or a Control SAP (C-SAP), and the NCMS can deliver (transfer) the primitives to the necessary locations including the upper management entities.

The M-SAP can have the functions for performing system configuration, for monitoring statistics, for notifications/triggers, etc., but are not limited to only these functions. The C-SAP can have the functions for performing handovers (e.g., notification of HO request from MS, etc.), for idle mode mobility management (e.g., mobile entering idle mode), for subscriber and session management (e.g., mobile requesting session setup), for radio resource management, etc., but are not limited to only these functions. Although the primitives of the present invention may be distinguished according to their functions above, such primitives can be delivered through the M-SAP and/or C-SAP.

Although the SAPs may be divided in terms of their functions as above, the primitives proposed by the present invention can be delivered through one of two SAPs, or through both. Regarding an effect of the present invention, because the primitives are delivered to the necessary upper layer via the NCMS, the entity that performs management and/or control of the entire system (mobile station or base station) is also allowed to manage the MAC and PHY layers as well.

Hereafter, the management entity refers to all entities that interface with the NCMS, and can be any logical management entity or physical management entity that exists in the IP layer or its upper layer within a device. The operation of the present invention may look as if the NCMS directly sends (delivers) the primitives, because communication is performed from the upper management entity, via the NCMS, to the Management SAP (M-SAP) or Control SAP (C-SAP).

Figure 1:
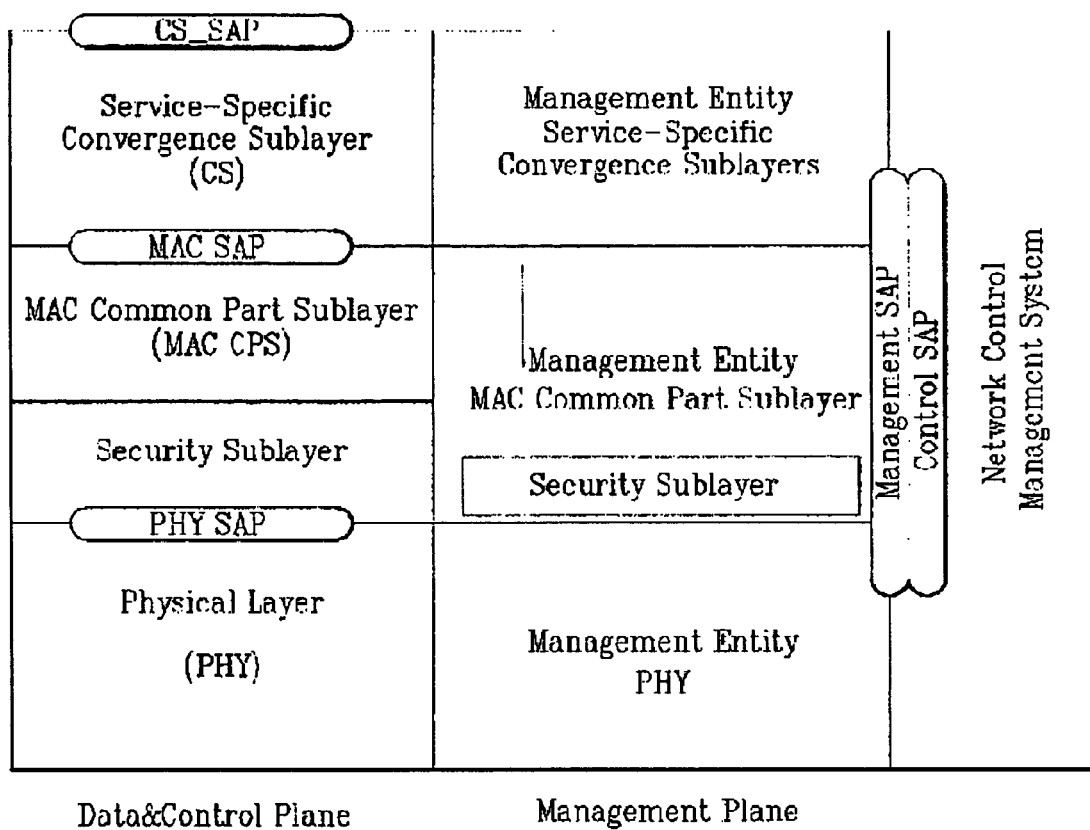
FIG. 1 depicts an exemplary protocol stack architecture for a broadband wireless access system.
Figure 2:
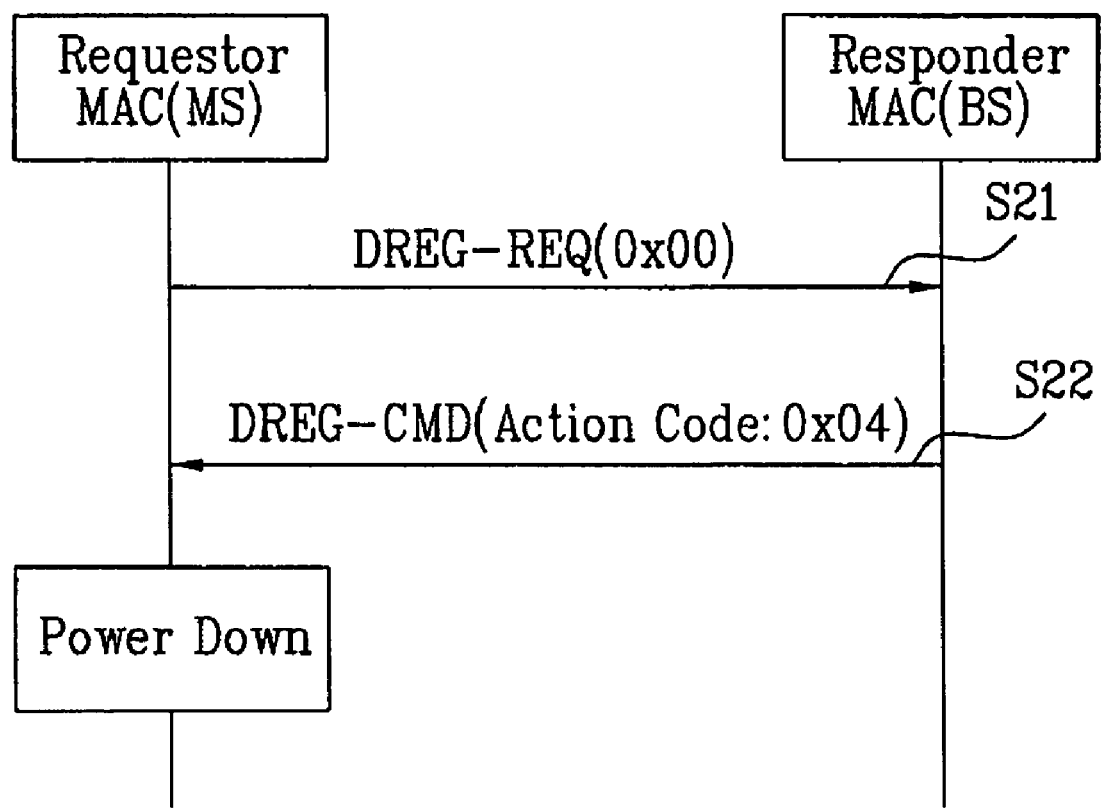
FIG. 2 depicts an exemplary signal flow for procedures of de-registration for power down.
Figure 3:
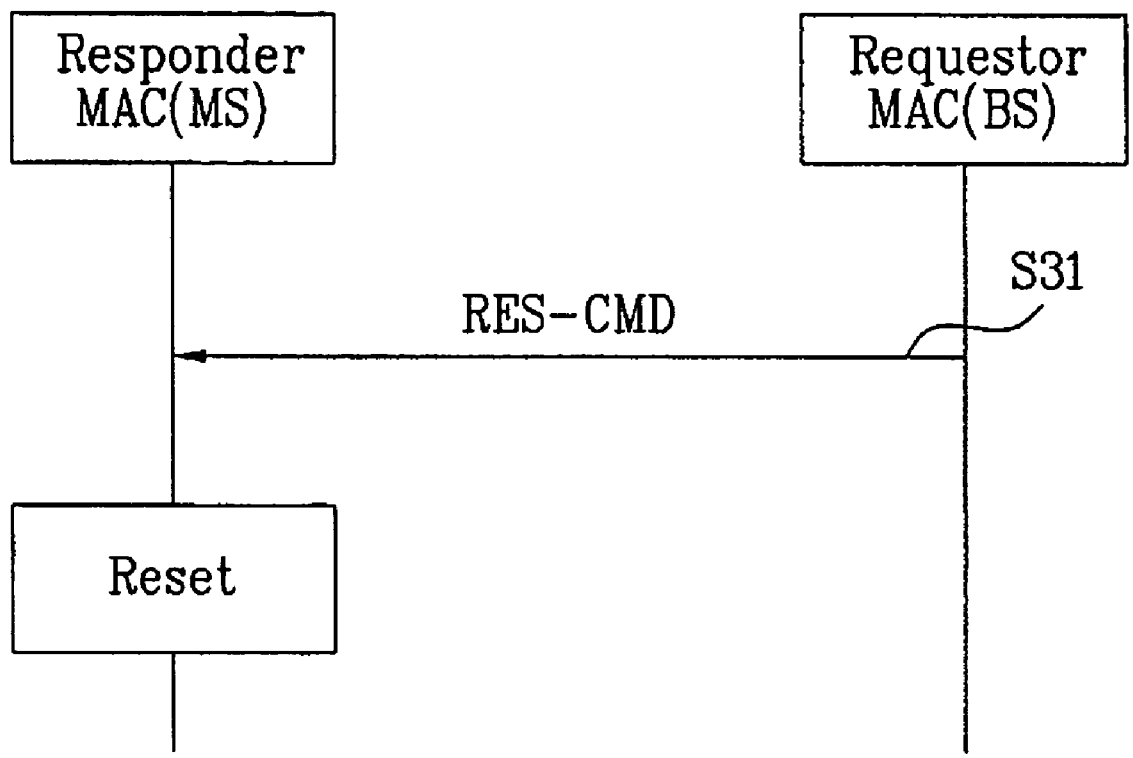
FIG. 3 depicts an exemplary signal flow for procedures of resetting the mobile station.
Figure 4:
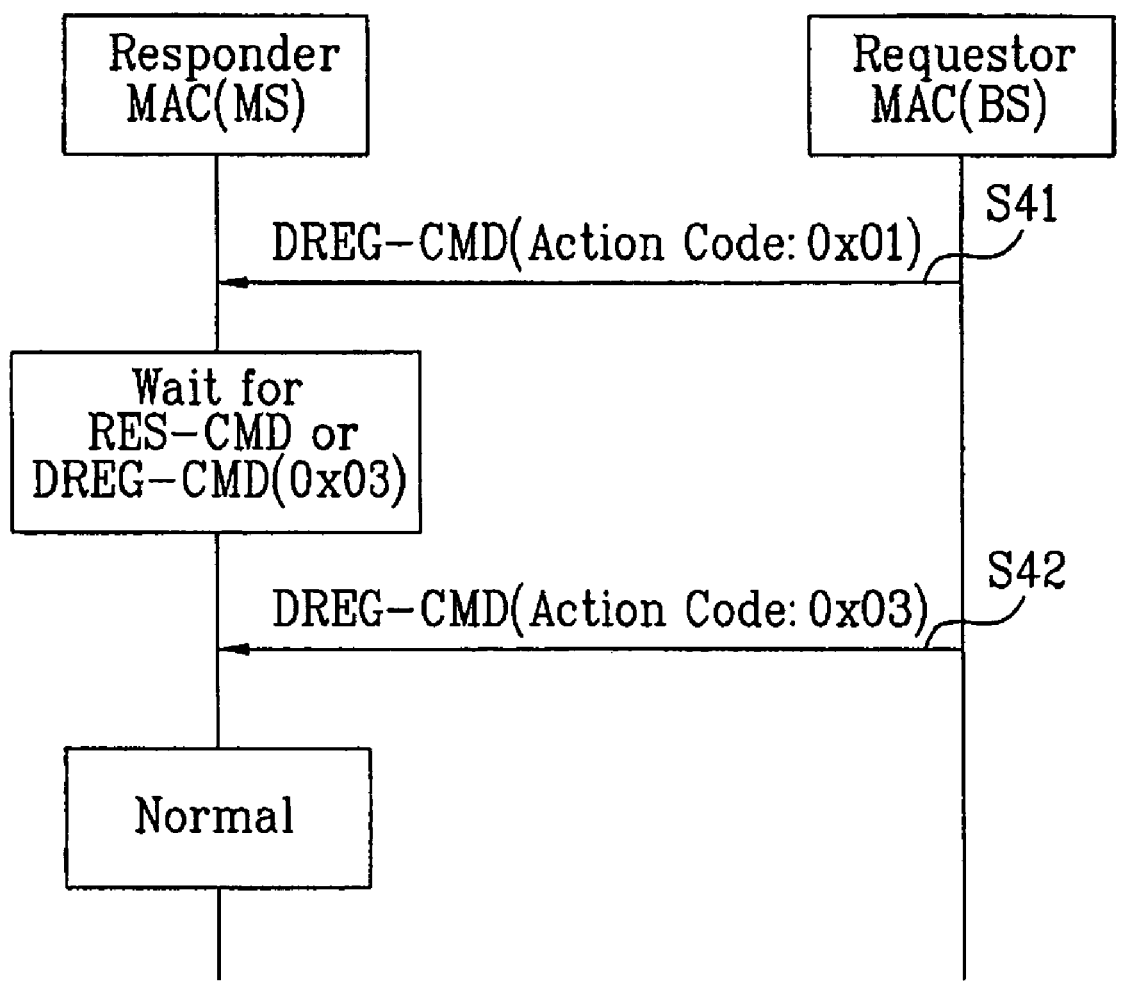
FIG. 4 depicts an exemplary signal flow for procedures of holding a normal operation of the mobile station.
Figure 5:
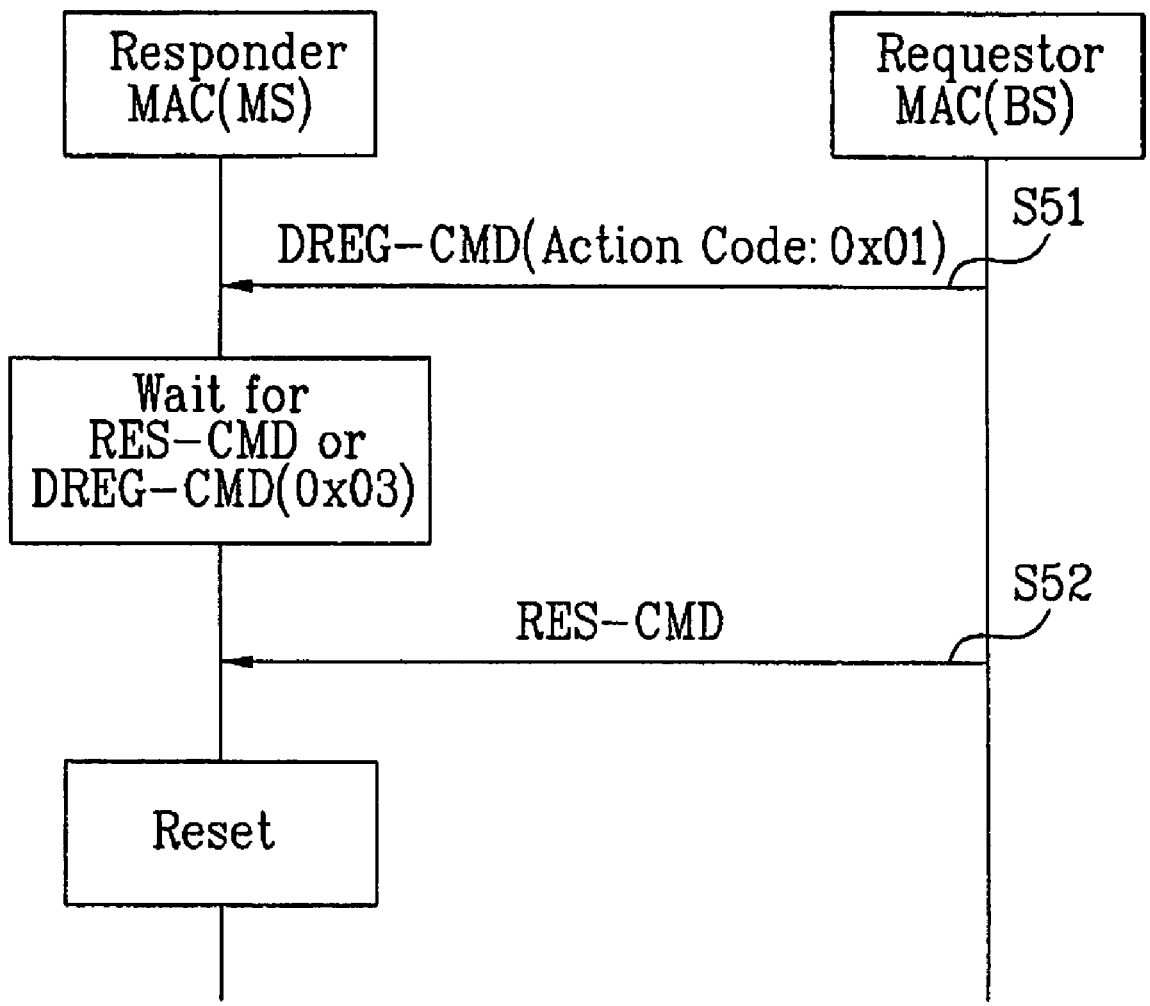
FIG. 5 depicts an exemplary signal flow for procedures of resetting after holding a normal operation of the mobile station.

The upper management entity used in the present invention can be located above a layer management entity within a protocol stack as shown in FIG. 1, and be divided into a physical or logical upper management entity that communicates through the NCMS or management SAP of a layer management entity. The upper management entity may exist within a particular protocol stack or may exist as a separate and independent system or stack, but will be conceptually referred to as an upper management entity.

Figure 7:
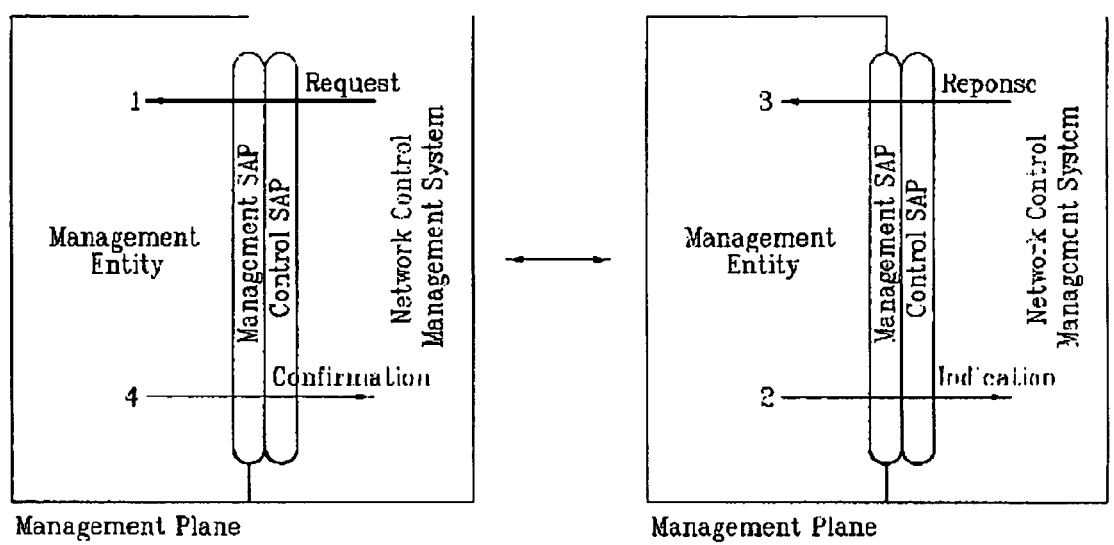
FIG. 7 depicts an exemplary operation when primitives are delivered by cooperation with a remote entity.
Figure 8:
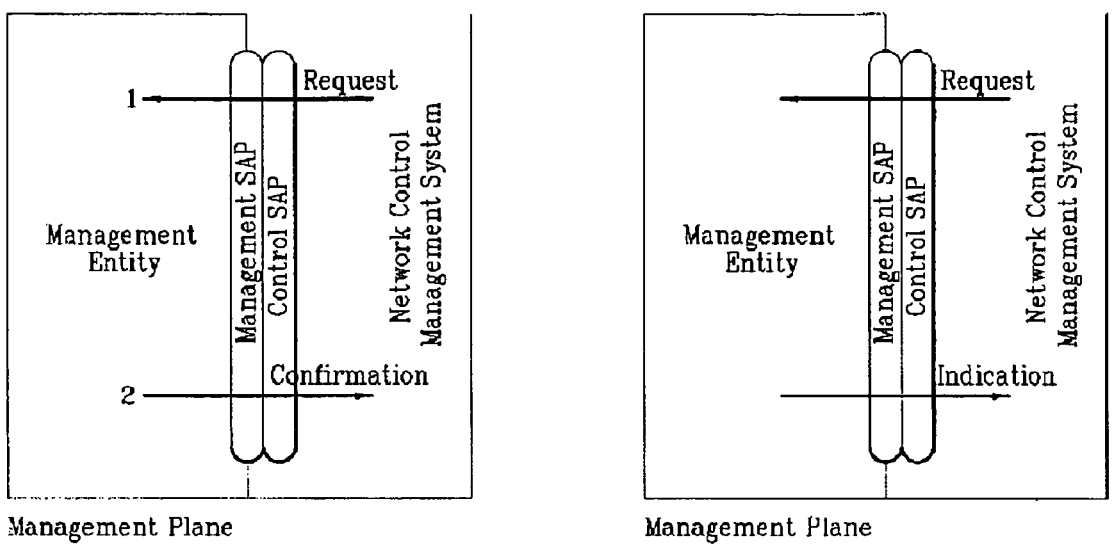
FIG. 8 depicts an exemplary operation when primitives are delivered only within a local entity.

FIGS. 7 and 8 depict the principles of how the primitives operate according to the present invention. Primitives that require cooperation with a remote entity are shown in FIG. 7, while primitives that are only delivered within a local stack are shown in FIG. 8.

As shown in FIG. 7, when there is cooperation with a remote entity, a pair of operations comprising a Request/Confirmation or comprising a Response/Indication are performed.

As shown in FIG. 8, when operations occur within a local stack, there may be two situations: mutual exchanges between the management entity and the NCMS (i.e., a bi-directional operation) or a unidirectional operation. For bi-directional operation, the delivery from the management entity through the M-SAP/C-SAP to the NCMS is called a Request, and its response that is transmitted is called an Indication. For uni-directional operation, the delivery from the management entity through the M-SAP/C-SAP to the NCMS is called a Request, and a unidirectional delivery in the opposite direction is called an Indication.

The primitives according to the present invention may be used for a multi-mode mobile station in which a management entity instructs a corresponding mode or when the corresponding mode delivers information to the entity that manages all the multi-modes. In such case, the following two situations can exist.

First, when the primitives are delivered from the MIH layer or MIH function to a lower layer, the MIH (layer or function) may interpret the information (e.g., commands, etc.) received from an upper layer when delivering the corresponding primitive or the upper layer information (command) may be mapped with the commands of the present invention and transmitted.

Second, when the primitives are delivered from the lower layer to the MIH layer or MIH function, the MIH (layer or function) may interpret the primitive received from the lower layer when transmitting the corresponding primitive (i.e., a unified primitive defined at the MIH) to be delivered to the upper layer or the primitive of the lower layer and the primitive to be sent to the upper layer may be simply mapped and then transmitted.

When used in Media Independent Handover (MIH), the primitives defined by the present invention may be delivered through the SAP between the NCMS and the MIH or the SAP between the management entity and the MIH such that MIH techniques can be achieved.

Hereafter, some examples of the primitives proposed by the present invention are explained. Only some parameters of the primitives explained herein are provided merely as non-limiting examples. If the contents of the parameters delivered to the MAC need to be delivered to the management entity, additional parameters not specified in this description may also be included. The contents of the parameters that are delivered to the MAC, as well as other necessary parameters, may be delivered in TLV (Type-Length-Value) format.

(1) M_Management.request Primitive

1) Function

The base station or upper management entity of the mobile station may use this primitive to request a change in the state of the mobile station.

2) Semantics

| M_Management.request | ( |
| --- | --- |
| | Source, |
| | Destination, |
| | MS address |
| | Action Code |
| | ) |

TABLE 5

| Name | Type | Valid Range | Description |
| --- | --- | --- | --- |
| Source | | N/A | Start point of Request |
| Destination | | N/A | Target point to which Request is delivered |
| MS Address | MAC Address | Any valid individual MAC address | MAC address of MS to be expectedly managed when BS uses request |
| Action Code | Enumeration | Power on Power off Reset Deregistration Hold Normal | Types of management |

3) Time of Formation

If requested by the mobile station, this primitive is formed when the mobile station requires an interaction with the base station in order to change its state (e.g., Deregistration) or when the mobile station desires to change its local state (e.g., power on, power off, reset, etc.). If requested by the base station, this primitive is formed when desiring to change the state (e.g., hold, reset, normal, etc.) of a certain mobile station.

4) Effect when Received

When the mobile station requests the primitive in order to change its local state and then receives the requested primitive, the mobile station MAC is changed into the corresponding state and notifies the change result to the base station using M_Management.confirmation. If the mobile station requires the interaction with the base station in order to change its state, when receiving the primitive, the mobile station MAC sends a MAC management message that is appropriate for an action code to the base station.

If the base station desires to change the state of a certain mobile station, the base station MAC sends a MAC management message for changing the mobile station state to the certain mobile station.

(2) M_Management.indication Primitive

1) Function

The M_Management.indication is a primitive used to inform the NCMS or the upper management entity of the reception of the MAC management message for the state change.

2) Semantics

```
M_Management.indication    (
                           Source,
                           Destination,
                           MS Address
                           Action Code
                           )
```

TABLE 6

| Name | Type | Valid Range | Description |
|---|---|---|---|
| Source | | N/A | Start point of Indication |
| Destination | | N/A | Target point to which Indication is delivered |
| MS Address | MAC address | Any valid individual MAC address | Address of MS which sent MAC management message for state change when BS receives this primitive |
| Action Code | Enumeration | Power on Power off Reset Deregistration Hold Normal | Types of management |

3) Time of Formation

The M_Management.indication primitive is formed when the MAC layer received the MAC management message (e.g., DREG-REQ, DREG-CMD, RES-CMD, etc.) for the state change via an air interface.

4) Effect when Received

When this primitive is received, the state can be managed by the upper management entity.

(3) M_Management.response Primitive 1) Function

The M_Management.response primitive indicates the state change of the mobile station in response to the state change request of the mobile station.

2) Semantics

```
M_Management.response    (
                         Source,
                         Destination,
                         MS Address
                         Action Code
                         )
```

TABLE 7

| Name | Type | Valid Range | Description |
|---|---|---|---|
| Source | | N/A | Start point of Response |
| Destination | | N/A | Target point to which Response is delivered |
| MS Address | MAC Address | Any valid individual MAC address | When BS receives this primitive, address of MS which sent MAC management message for state change |
| Action Code | Enumeration | Power on Power off Reset Deregistration Hold Normal | Types of management |

3) Time of Formation

The M_Management.response primitive is formed when desiring to indicate the state change when received an action code deregistration using the M_Management.indication.

4) Effect when Received

When this primitive is received, DREG-CMD is sent to the corresponding mobile station.

(4) M_Management.confirmation Primitive

1) Function

The M_Management.confirmation primitive is used to inform a successful state change to the upper management entity.

2) Semantics

```
M_ScanScheduling.confirmation    (
                                 Source,
                                 Destination,
                                 Result
                                 )
```

TABLE 8

| Name | Type | Valid Range | Description |
|---|---|---|---|
| Source | | N/A | Start point of Confirmation |
| Destination | | N/A | Target point of Confirmation |
| Result | Enumeration | Success Fail | Whether state change is successfully performed |

3) Time of Formation

The M_Management.confirmation primitive is formed and delivered to indicate success or failure at the time when the state change is determined at the MAC.

4) Effect when Received

Based upon the result, for success, the state of the upper management entity is updated, while for failure, the state change is attempted again.

Figure 9:
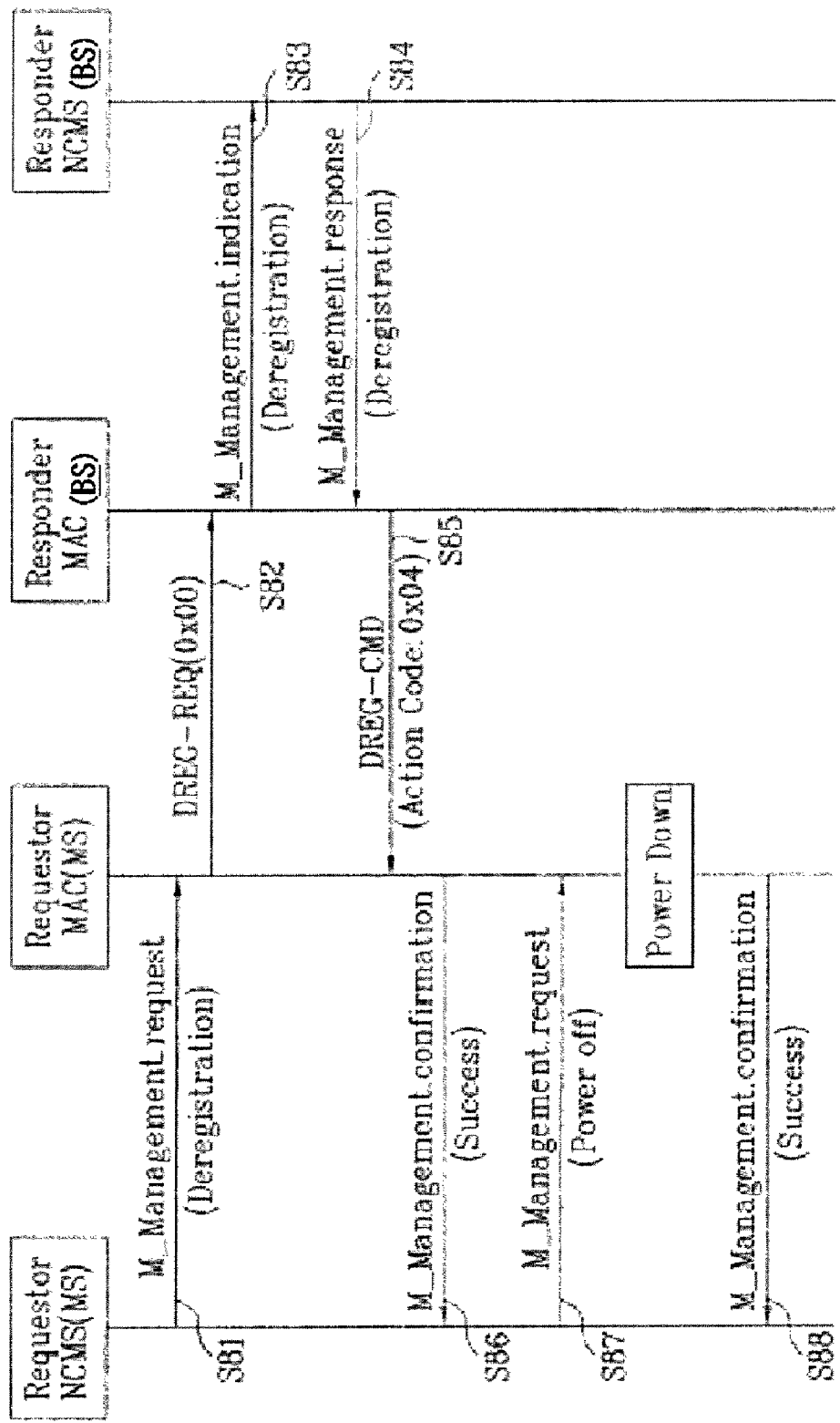
FIG. 9 depicts an exemplary signal flow for a power down state change procedure after de-registration.

FIG. 9 depicts an exemplary signal flow for a power down state change procedure after de-registration. As shown in FIG. 9, the mobile station upper management entity requests the mobile station MAC layer to perform a deregistration procedure (S81).

The mobile station MAC layer that received the deregistration request transmits a DREG-REQ over the air interface (S82). The base station MAC layer that received the DREG-REQ reports this to its upper management entity (S83). The upper management entity determines the deregistration requested by the mobile station, and transmits to the base station MAC layer by including the corresponding action code (S84).

Based upon the primitive received from the upper management entity, the base station MAC layer sets the action code of the DREG-CMD and transmits to the mobile station (S85). The deregistration results are informed to the mobile station upper management entity (S86). The exemplary embodiment shows the situation of a successful deregistration.

The upper management entity requests the mobile station to turn off its power (S87). Turning off power may include the termination of physical layer operations to save power. The exemplary embodiment shows that power is turned off after deregistration, but power may be turned off without deregistration. The result of requesting power turn off is reported (S88).

Figure 10:
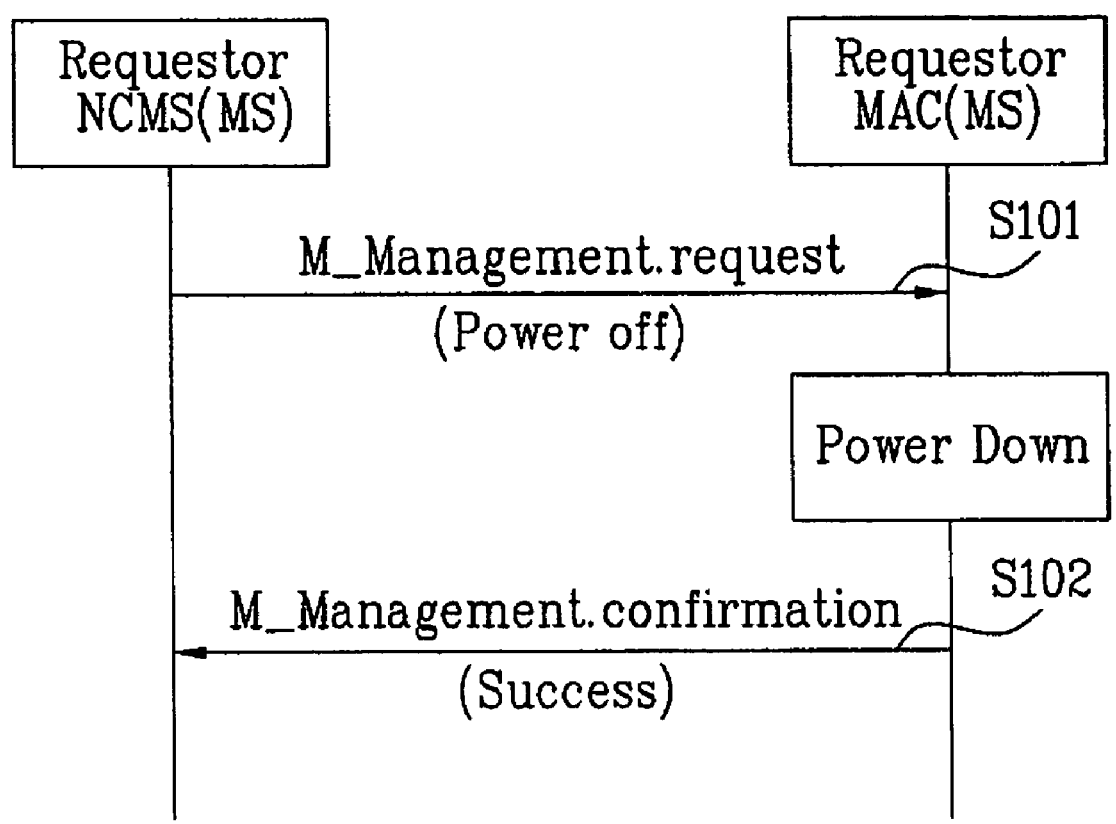
FIG. 10 depicts an exemplary signal flow for a power down state change procedure.

FIG. 10 depicts an exemplary signal flow for a power down state change procedure. The upper management entity requests the mobile station power to be turned off (S101). The result of the power turn off request is reported to the upper management entity (S102).

Figure 11:
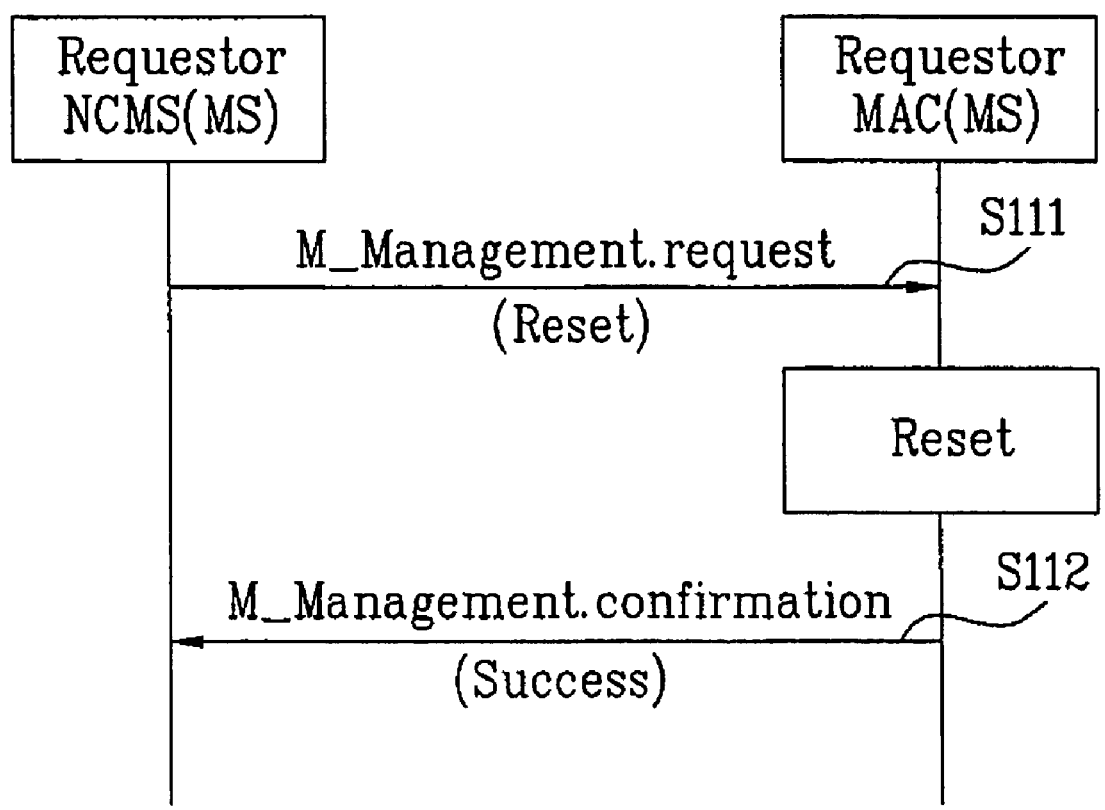
FIG. 11 depicts an exemplary signal flow for a reset state change procedure.

FIG. 11 depicts an exemplary signal flow for a reset state change procedure. The upper management entity requests the mobile station to perform reset (S111). As with the operation when a RES-CMD is received, the mobile station resets itself and its MAC layer is initialized (S112).

Figure 12:
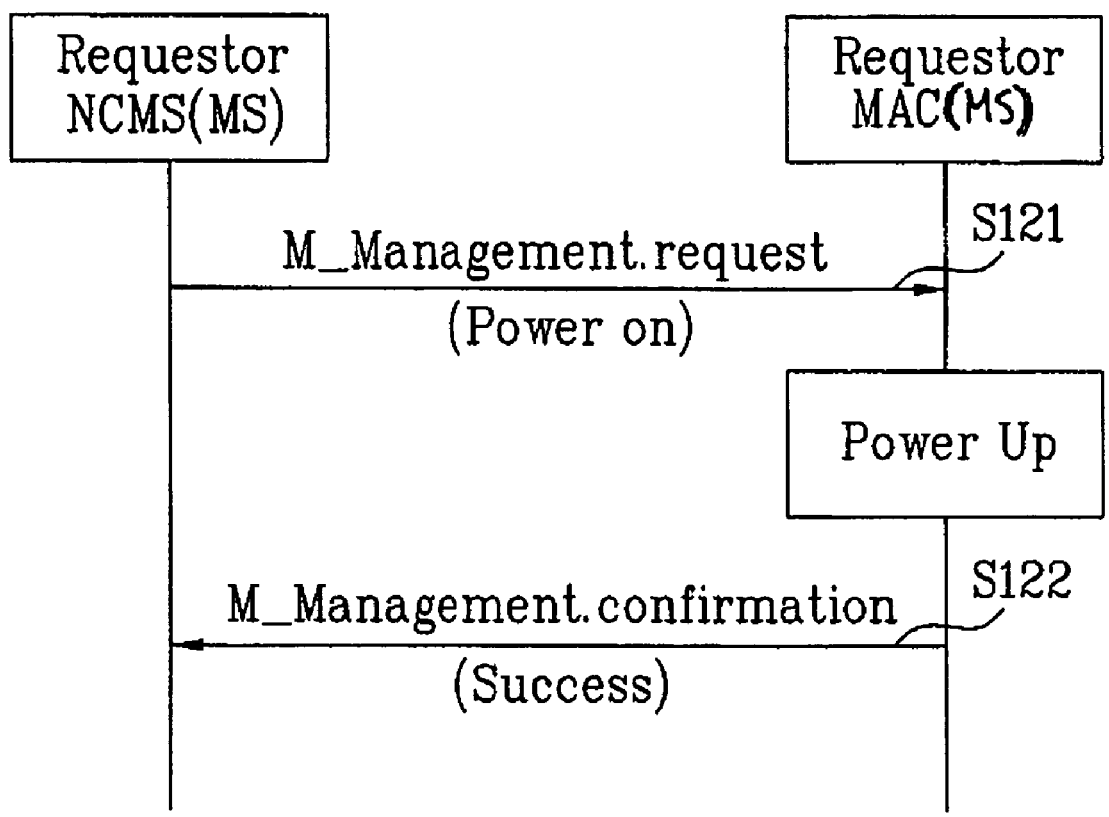
FIG. 12 depicts an exemplary signal flow for a power on state change procedure.

FIG. 12 depicts an exemplary signal flow for a power on state change procedure. The upper management entity requests the mobile station to turn on its power (S121). The mobile station turning on its power refers to activating the operation of the physical layer. Namely, the physical layer is put into a state in which operations such as scanning can be performed. The result of the power turn on request is reported to the upper management entity (S122).

Figure 13:
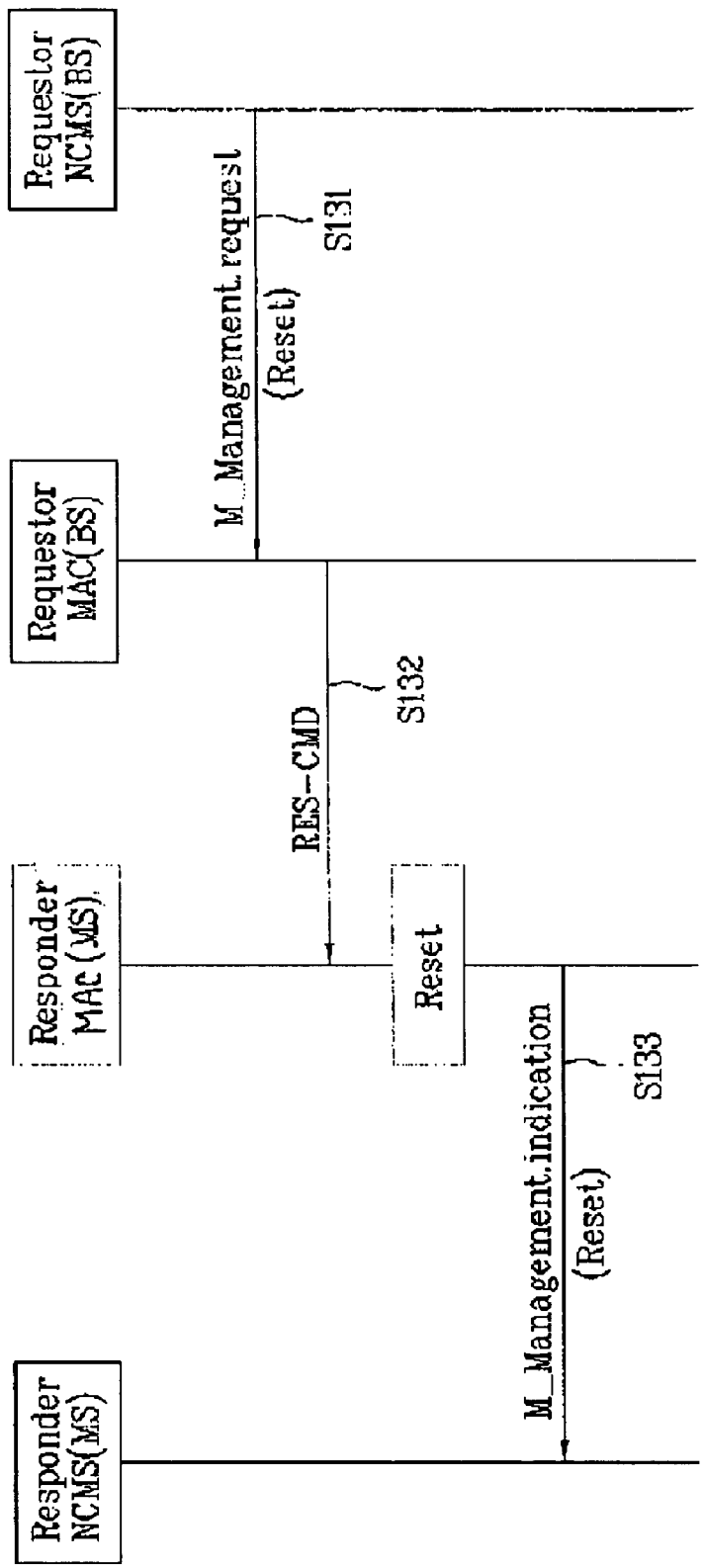
FIG. 13 depicts an exemplary signal flow for a mobile station reset procedure according to a base station request.

FIG. 13 depicts an exemplary signal flow for a mobile station reset procedure according to a base station request. The base station NCMS or the upper management entity discovers an abnormal operation in a certain mobile station and sends to the base station MAC layer, a request to reset the mobile station (S131). Upon receiving a reset request of a certain mobile station from the upper management entity, the base station MAC layer sends a RES-CMD in order to reset the mobile station (S132).

Upon receiving the RES-CMD, the mobile station resets itself and after initializing its MAC layer, the results are reported to the upper management entity (S133).

Figure 14:
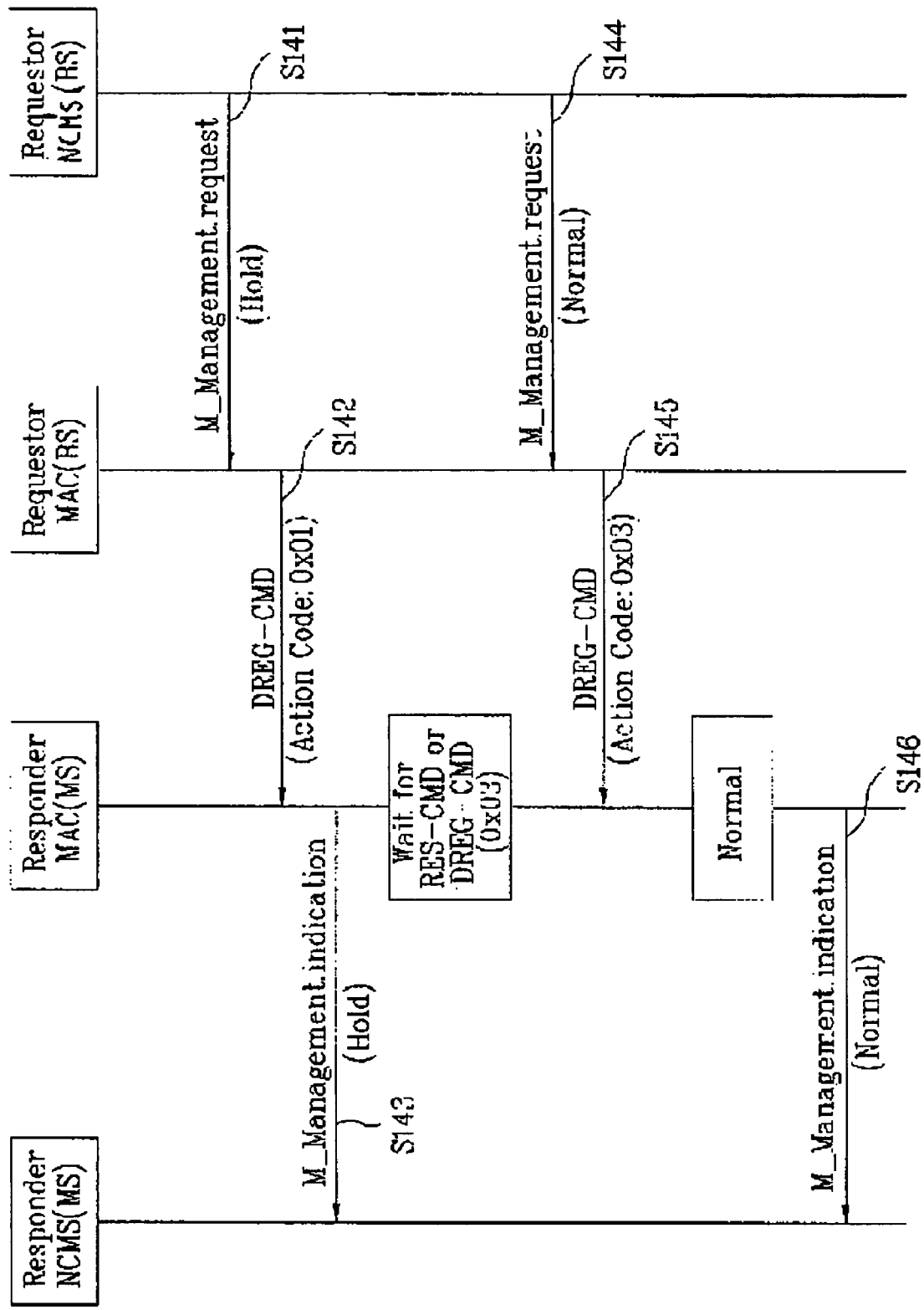
FIG. 14 depicts an exemplary signal flow for a mobile station normal state hold and restore procedure according to a base station request.

FIG. 14 depicts an exemplary signal flow for a mobile station normal state hold and restore procedure according to a base station request. Whether due to an abnormal operation of the mobile station or due to other network conditions, the NCMS or upper management entity sends a primitive to the base station MAC layer to transmit a message for holding a normal operation of the mobile station (S141).

Upon receiving the primitive, the base station MAC transmits to a particular mobile station, a message for holding the mobile station via the DREG-CMD (0x01) message (S142). Upon receiving this message, the mobile station informs this to the upper management entity via a primitive, and holds its normal operation until a RES-CMD or DREG-CMD (0x03) is received (S143). The exemplary embodiment shows that state transition is performed after reporting, but performing the state transition before reporting also results in the same effect.

After determining that the mobile station may return to its normal operation, the upper management entity transmits, to the base station MAC layer, a primitive in order to transmit a message instructing the mobile station to perform its normal operation. The base station transmits a DREG-CMD (0x03) message to a particular mobile station informing it to transition into normal operation.

Upon receiving the DREG-CMD (0x03) message, the mobile station transitions into normal operation, and this state transition is informed to the NCMS or upper management entity via a primitive. The exemplary embodiment shows that state transition is performed after reporting, but performing the state transition before reporting also results in the same effect.

Figure 15:
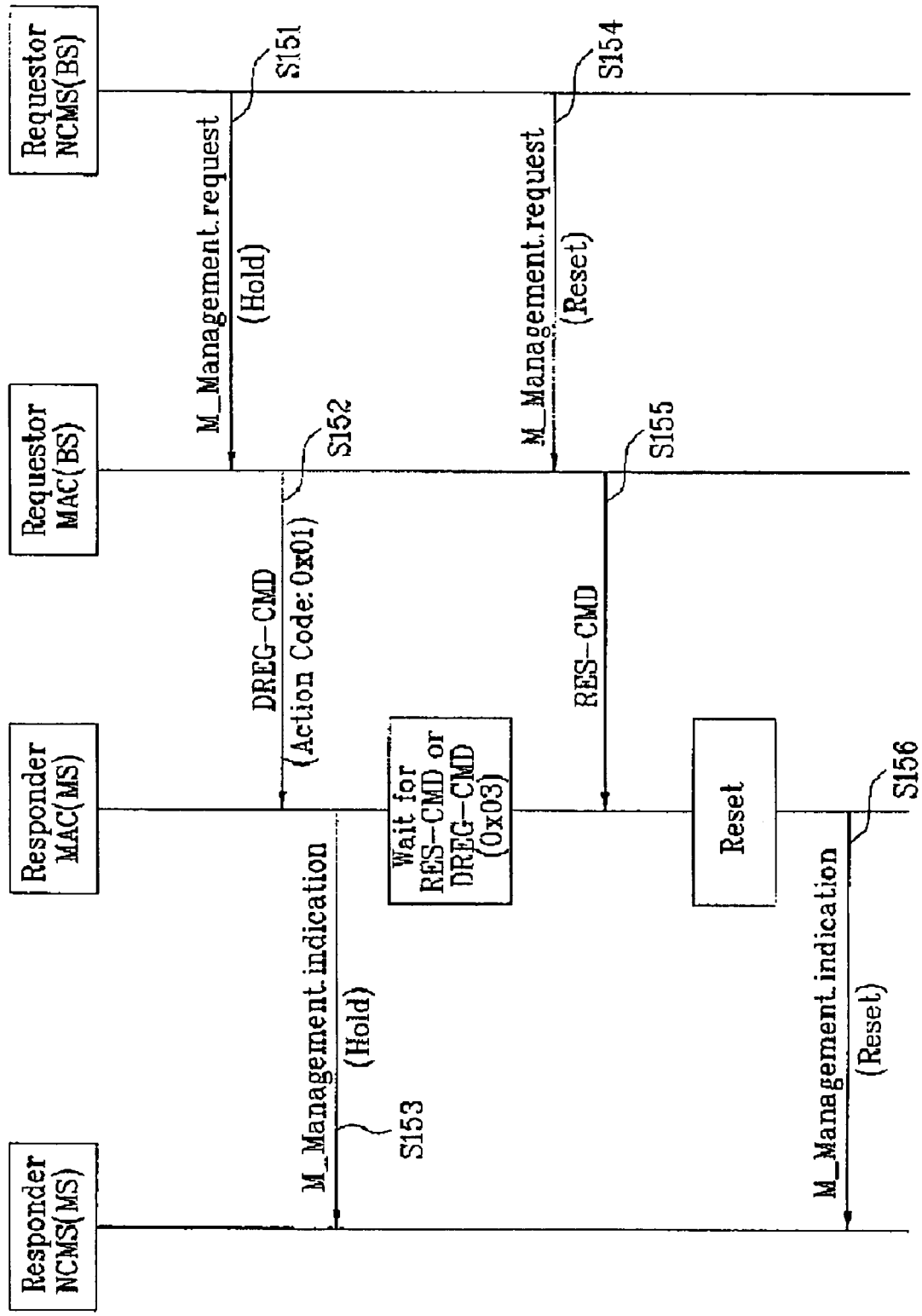
FIG. 15 depicts an exemplary signal flow for a mobile station normal state hold and reset procedure according to a base station request.

FIG. 15 depicts an exemplary signal flow for a mobile station normal state hold and reset procedure according to a base station request. Whether due to an abnormal operation of the mobile station or due to other network conditions, the NCMS or upper management entity sends a primitive to the base station MAC layer to transmit a message for holding a normal operation of the mobile station (S151).

Upon receiving the primitive, the base station MAC transmits to a particular mobile station, a message for holding the mobile station via the DREG-CMD (0x01) message (S152). Upon receiving this message, the mobile station informs this to the upper management entity via a primitive, and holds its normal operation until a RES-CMD or DREG-CMD (0x03) is received (S153). The exemplary embodiment shows that state transition is performed after reporting, but performing the state transition before reporting also results in the same effect.

After a certain amount of time, the base station upper management entity determines to reset the mobile station, and transmits a reset request to the base station MAC layer (S154). Upon receiving a reset request for a particular mobile station from the upper management entity, the base station MAC layer transmits a RES-CMD in order to reset the mobile station (S155). Upon receiving the RES-CMD, the mobile station resets itself and after initializing its MAC layer, the results are transmitted to the upper management entity (S156). The exemplary embodiment shows reporting after state transition, but reporting and then performing the state transition also results in the same effect.

To implement the various features described above, the present invention can employ various types of hardware and/or software components (modules). For example, different hardware modules may contain various circuits and components necessary to perform the steps of the above method of executing scanning in a broadband wireless access system. Also, different software modules (executed by processors and/or other hardware) may contain various codes and protocols necessary to perform the steps of the present invention method.

For mobile station managing (viewpoint of MS MAC), the present invention provides a method of managing a mobile station in a broadband wireless access system, comprising: receiving, from a MS NCMS or an upper entity, a first primitive that indicates a management request; and sending, to the MS NCMS or the upper entity, a second primitive that indicates a management confirmation. The MS NCMS supports a management function of a mobile station, and is a layer in an independent entity that is a management entity. The upper entity comprises at least an MIH or one or more other management entities. The method may further comprise: establishing a unified interface to an upper layer of the mobile station for managing messages to and from at least one of a homogeneous network and a heterogeneous network. The first primitive comprises an action code. The action code indicates at least one of a power on/off, MAC reset, deregistration, hold, normal, link disconnect, link sleep, or link power down. The second primitive indicates a result of a success, failure, or reject of a state change. The method may further comprise between the receiving step and the sending step: sending, to a network, a first management message; and receiving, from the network, a second management message. The first management message indicates a deregistration request. The second management message indicates a deregistration command.

For mobile station managing (viewpoint of MS MAC), the present invention provides a method of managing a mobile station in a broadband wireless access system, comprising: receiving, from a network, a message that indicates a state change of a MAC of the mobile station; and sending, to a MS NCMS or an upper entity, a primitive that allows the MS NCMS or the upper entity to be notified of the state change of the MAC of the mobile station. The message comprises at least one of a reset command and a deregistration command. The deregistration command indicates hold or transition to normal state. The state change comprises at least one of reset, normal, hold.

For mobile station managing (viewpoint of MS MIH), the present invention provides a method of managing a mobile station in a broadband wireless access system, comprising: establishing a unified interface to an upper layer of the mobile station for managing messages to and from at least one of a homogeneous network and a heterogeneous network; and receiving, from a MS NCMS, a primitive that allows the unified interface (MIH) to be notified of a state change of a MAC of the mobile station. The primitive indicates at least one of a reset, normal, hold. The primitive indicates a result of a success, failure, or reject of a state change request. The method may further comprise: sending, to the MS MAC, a primitive that indicates a state change request of the MAC of the mobile station. The primitive comprises an action code. The action code indicates at least one of power on (up)/off (down), (MAC) reset, de-registration, hold, normal, link disconnect, link sleep, or link power down.

For mobile station managing (viewpoint of BS MAC), the present invention provides a method of managing a mobile station in a broadband wireless access system, comprising: receiving, from a network NCMS or an upper entity, a primitive that allows the network NCMS or the upper entity to command the state change of a MAC of a mobile station; and sending, to the MS MAC, a message that indicates a state change of the MAC of the mobile station. The primitive indicates at least one of a reset, normal, hold, deregistration. The message commands at least one of a reset, normal, hold, deregistration. The method may further comprise, before the receiving step: receiving, from the MS MAC, a message that indicates deregistration request from the network; and sending, to a network NCMS or an upper entity, a primitive that indicates deregistration of a mobile station.

For mobile station managing (viewpoint of BS MIH), the present invention provides a method of managing a mobile station in a broadband wireless access system, comprising: establishing a unified interface to an upper layer of a network for managing messages to and from at least one of a homogeneous network and a heterogeneous network; and sending, to a network NCMS, a first primitive that allows the unified interface (MIH) to command a state change of a MAC of the mobile station. The first primitive indicates at least one of a reset, normal, hold, deregistration. The method may further comprise: receiving, from the network NCMS, a second primitive that indicates deregistration of a mobile station.

As for the results of the present invention, when the mobile station is managed by using the primitives defined according to the present invention, accurate operations within the protocol stack layers can be achieved. Accordingly, Media Independent Handover (MIH) procedures can be achieved because the NCMS and MIH layer can communicate in a direct or indirect manner through use of the primitives.

This specification describes various illustrative embodiments of the present invention. The scope of the claims is intended to cover various modifications and equivalent arrangements of the illustrative embodiments disclosed in the specification. Therefore, the following claims should be accorded the reasonably broadest interpretation to cover modifications, equivalent structures, and features that are consistent with the spirit and scope of the invention disclosed herein.

The invention claimed is:

1. A method of managing a mobile station in a broadband wireless access system, comprising:
  receiving, from a mobile station (MS) network control management system (NCMS) or an upper entity, a first primitive that indicates a management request, wherein the first primitive comprises an action code indicating a change of a state of the mobile station and at least a power on, a power off, a power down, a reset, a deregistration, a hold, or a normal state;
  changing the state of the mobile station; and
  sending, to the MS NCMS or the upper entity, a second primitive that indicates a management confirmation, wherein the second primitive indicates a result of changing the state of the mobile station, the result comprising a success, a failure, or a rejection of the change of the state.

2. The method of claim 1, wherein the MS NCMS is a layer in an independent management entity and supports a management function of the mobile station.

3. The method of claim 1, wherein the upper entity comprises at least a media independent handover (MIH) or one or more other management entities.

4. The method of claim 1, further comprising:
  establishing a unified interface to an upper layer of the mobile station for managing messages to and from at least one of a homogeneous network and a heterogeneous network.

5. The method of claim 1, further comprising between the receiving step and the sending step:
  sending, to a network, a first management message; and
  receiving, from the network, a second management message.

6. The method of claim 5, wherein the first management message indicates a deregistration request.

7. The method of claim 5, wherein the second management message indicates a deregistration command.

8. A method of managing a mobile station in a broadband wireless access system, the method comprising:
  receiving, from a network, a message that indicates a change of a state of the mobile station, wherein the change of the state is at least a power on, a power off, a power down, a reset, a deregistration, a hold, or a normal state;
  changing the state of the mobile station; and
  sending, to a mobile station (MS) network control management system (NCMS) or an upper entity of the mobile station, a primitive that allows the MS NCMS or the upper entity to be notified of the change of the state of the mobile station.

9. A method of managing a mobile station in a broadband wireless access system, the method comprising:

establishing a unified interface (MIH) to an upper layer of the mobile station for managing messages to and from at least one of a homogeneous network and a heterogeneous network;

sending, to the mobile station, a first primitive comprising an action code indicating a request to change a state of the mobile station and indicating at least a power on, a power off, a power down, a reset, a deregistration, a hold, or a normal state; and receiving, from a mobile station (MS) network control management system (NCMS), a second primitive that allows the MIH to be notified of a changed state of the mobile station wherein the second primitive indicates a result of the request to change the state of the mobile station, the result comprising a success, a failure, or a rejection of the change of the state.

10. A method of managing a mobile station in a broadband wireless access system, the method comprising:

receiving, from a network control management system (NCMS) of a network or from an upper entity, a first primitive that allows the NCMS of the network or the upper entity to command a change of a state of the mobile station, wherein the change of the state is at least a power on, a power off, a power down, a reset, a deregistration, a hold, or a normal state; and sending, to the mobile station, a message that indicates the change of the state of the mobile station.

11. The method of claim 10, further comprising, before receiving the first primitive:

receiving, from a mobile station (MS) media access control (MAC), a message that indicates a deregistration request from the network; and sending, to the NCMS of the network or the upper entity, a second primitive that indicates the deregistration of the mobile station.

12. A method of managing a mobile station in a broadband wireless access system, the method comprising:

establishing a unified interface (MIH) to an upper layer of a network for managing messages to and from at least one of a homogeneous network and a heterogeneous network; and sending, to a network control management system (NCMS), a first primitive that allows the MIH to command a change of a state of the mobile station, wherein the first primitive indicates at least a power on, a power off, a power down, a reset, a deregistration, a hold, or a normal state.

13. The method of claim 12, further comprising:

receiving, from the NCMS, a second primitive that indicates the deregistration of the mobile station.

* * * * *